INVENTOR.
Thomas F. Donohue
BY
Paul Fitzpatrick
ATTORNEY

Jan. 5, 1965

T. F. DONOHUE 3,163,983

LOAD COUPLING AND FUEL CONTROL MEANS
FOR A PLURALITY OF ENGINES

Filed June 6, 1961

INVENTOR.
Thomas F. Donohue
BY
Paul Fitzpatrick
ATTORNEY

United States Patent Office 3,163,983
Patented Jan. 5, 1965

3,163,983
LOAD COUPLING AND FUEL CONTROL MEANS FOR A PLURALITY OF ENGINES
Thomas F. Donohue, Cincinnati, Ohio, assignor to General Motors Corporation, Detroit, Mich., a corporation of Delaware
Filed June 6, 1961, Ser. No. 115,264
6 Claims. (Cl. 60—39.15)

My invention relates to provisions for driving accessory devices and providing inputs to the controls of grouped or clustered engines, such as jet engines of various types. The invention is related to some extent to my copending application No. 115,265, filed June 6, 1961 for Coupled Engines. In the system of that application, a number of engines in a group are coupled to a common accessory drive gear through clutches which maintain a positive coupling between all of the engines and between them and the accessory drive unless one engine absorbs sufficient power to indicate that it is defective or failing, whereupon it is disconnected.

The system of this application is directed to a system of a different type in which the accessory load may be driven from any one of the engines of a group, these engines being coupled to the accessory load through overrunning clutches or the equivalent.

It is intended that all the engines of a group run at the same speed, but differences between engines tend to preclude the exact attainment of this objective. However, the addition of the accessory load, or the major part of it, to the engine or engines which tend to outspeed the other may brake them sufficiently to hold all of the engines of a group at the same speed.

If it does not, it is possible to alter the relative flow of fuel to the engines to increase the power output of those which lag. For some purposes of engine control of a group or cluster of engines, it is desirable to have a signal of speed of the fastest engine. This may be used, for example, for overspeed governing or for governing to a desired power output level. However, for other purposes, such as acceleration limiting, the limit may better be based upon the speed of the slowest engine. Measures to alter the distribution of fuel between engines of a group should be based upon the differences of speeds between the engines.

In the system of my invention, a mechanism is provided which is driven by each engine of a group and which provides outputs of the speed of the fastest engine, of the speed of the slowest engine, and of differences between speeds of the engine.

The shaft which is driven at the speed of the fastest engine or engines, and which is directly driven by it or them through overrunning clutches, may serve to drive various engine accessories and provide power to meet airplane requirements, as by driving a pump for a hydraulic power system or generators for electric power.

The nature of the invention and the advantages thereof will be apparent to those skilled in the art from the accompanying drawings and the succeeding detailed description of the preferred embodiment of the invention.

Figure 1:
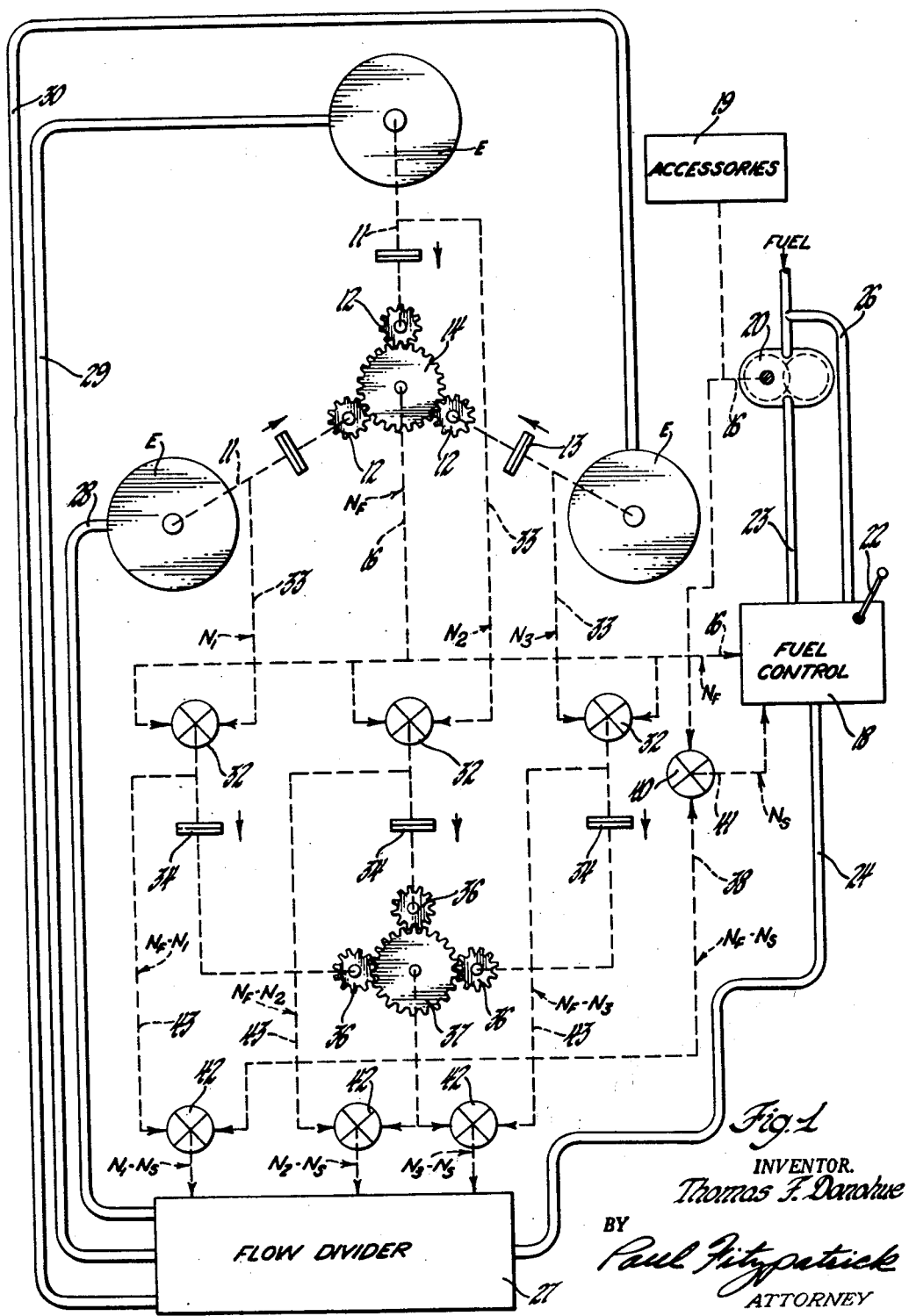
FIGURE 1 is a schematic diagram of a cluster of three engines coupled to the control and accessory drive device of the invention.

Referring to FIGURE 1, there are illustrated three engines E, which may be turbojet or other thermal jet engines having a rotating part which may furnish power to a shaft. While three engines are shown, it will become apparent that the principles of the invention are equally applicable to groups of greater number. A power take-off shaft 11 from each engine drives a pinion 12 through an overrunning clutch 13. All of the pinions 12 are meshed with a common main drive gear 14. The speeds of the engines are represented by the speeds of shafts 11, which may be termed $N_1$, $N_2$, and $N_3$. Because of the overrunning clutches 13, the speed of gear 14 is proportional to $N_F$, the speed of the fastest engine. The gear 14 is coupled through shafting indicated by 16 to a main fuel control 18, an accessory drive case 19, and a fuel pump 20. The accessory drive case may provide mounting pads and driving connections for the usual engine and aircraft accessories to be driven by the engines. The fuel control, which may embody various devices responsive to ambient conditions and engine speed to meter or control fuel (such devices being well known) may have a speed or power setting put in by a manual control lever 22. The fuel control may receive fuel from the pump 20 through a line 23, deliver the meter quantity to the engines through line 24, and return the excess fuel to the pump through a return line 26. Since a common fuel supply is used for the three engines, the fuel must be divided between them. This may be accomplished by a flow divider 27 of any suitable structure which primarily divides the flow into three equal portions which are supplied through lines 28, 29, and 30 to the respective engines E. It may also include means for trimming the flow to the engines. We have seen how the means for providing power to the accessories through the shaft 16 is driven by the fastest engine and provides an input of this speed to the fuel control 18. Proceeding with other parts of the control device in the schematic of FIGURE 1, the shaft 16 driven by the fastest engine through gear 14 provides an input to each of three subtracting differential gears 32. Each of these differential gears receives its other input, the speed of one of the engines ($N_1$, $N_2$, or $N_3$), through a connection 33 driven by the engine power take-off shaft 11. The output of each differential 32 is coupled through an overrunning clutch 34 to a pinion 36. All of the pinions 36 mesh with a gear 37. Since the input to each differential 32 is the difference between speed of the fastest engine and the speed of the particular engine, its output will be half this speed difference. The greatest output will, of course, be half the speed difference between the fastest and slowest engines. Because of the overrunning clutches 34, this output will drive gear 37. Gear 37 thus moves proportional the maximum speed difference and thus represents $N_F - N_S$ where $N_S$ is the speed of the slowest engine and supplies this through connections 38 to a subtracting differential 40, the other input of which is provided from shaft 16 driven by the fastest engine. The resulting output through a shaft 41 is $N_S$, the speed of the slowest engine, which may be supplied to acceleration limiters or, if desired, to other fuel metering devices of the fuel control.

Figure 2:
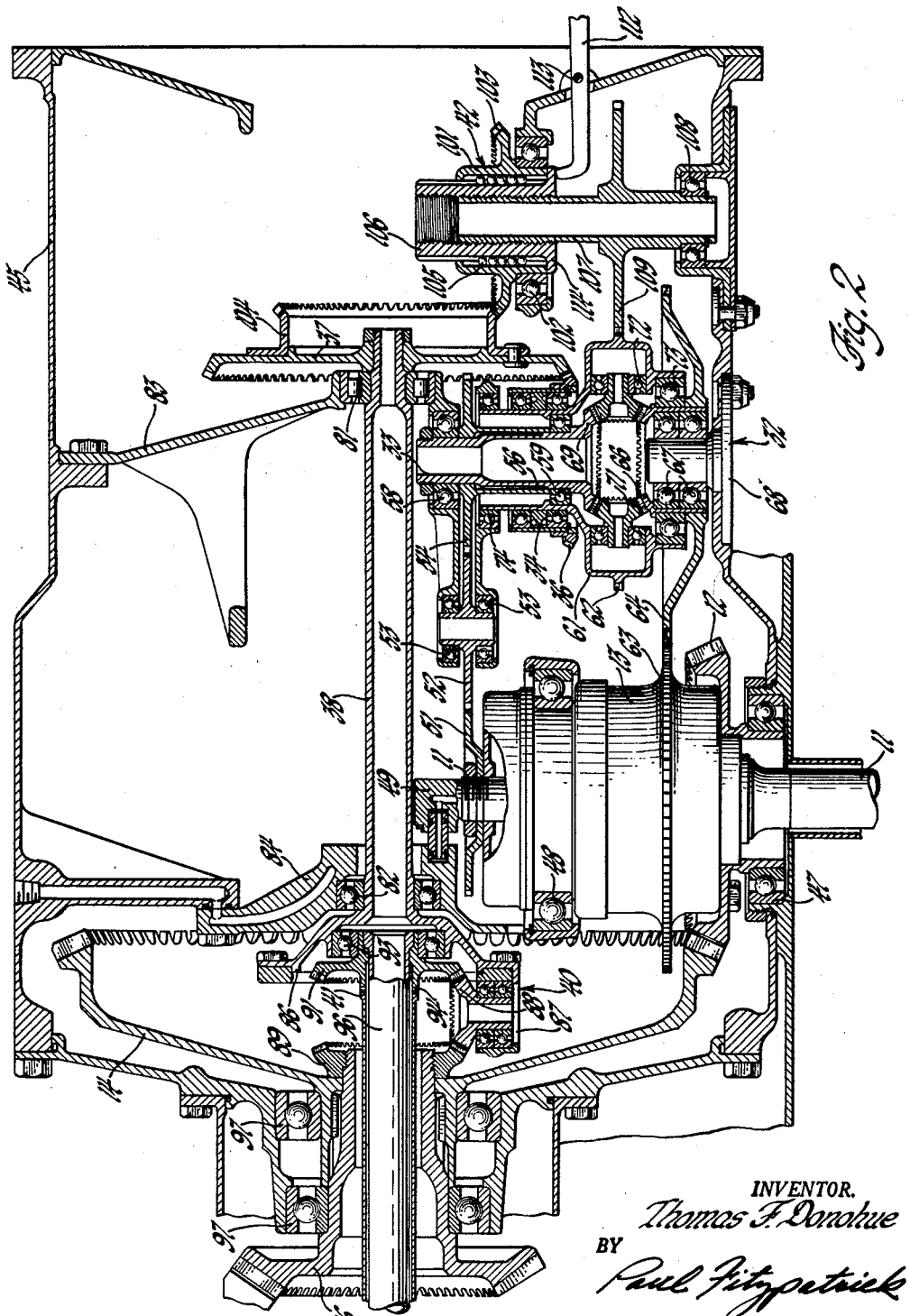
FIGURE 2 is a longitudinal sectional view of my accessory drive device.

The remaining function of the gearing illustrated in FIGURE 2 is to arrive at outputs representative of differences of engine speeds which may be supplied to the flow divider 27. The line 38, the speed of which is proportional to the difference between the fastest and slowest engine speeds, provides one input to each of three subtracting differentials 42. The other input of each of these differentials is supplied directly by the output of one of the differentials 32 through a coupling which is indicated by the line 43. The quantity in each line 43 is proportional to the fastest engine speed minus the speed of the engine which provides the input to the differential. The gear ratios are so selected that both these inputs enter at the same gear ratio so that the term representative of fastest engine speed supplied to both sides of the differential cancels out and the output is the speed of the individual engine minus the speed of the slowest engine ($N_1-N_S$, $N_2-N_S$, or $N_3-N_S$).

With this introduction to the general nature of the system and the gearing setup of the control device in FIGURE 2, we may now proceed to the structure shown in FIGURE 2.

Referring to FIGURE 2, the gearing and clutches which have been outlined are contained in a case 45 of generally cylindrical shape. One of the three engine-driven input shafts 11 is shown, these shafts being preferably at 120° angles around the axis of the case, which is also the axis of gear 14 and shaft 16 previously mentioned, this shaft being driven proportionally to the speed of the fastest engine. The shaft 11 is coupled through an overrunning clutch 13, the structure of which is immaterial to the invention, to one of the bevel gears 12 which drives gear 14 and shaft 16. Gear 12 and overrunning clutch 13, which are bolted together, are mounted for rotation in the fixed structure of the case by two ball bearings 47 and 48. The inner end of shaft 11 projects through the overrunning clutch and receives a fitting 49 through which lubricating and cooling oil is supplied to the clutch, this fitting being piloted into shaft 11. A gear 51 is fixed to the inner end of shaft 11. This gear drives an idler gear 52 supported in the case by ball bearings 53 which, in turn, drives gear 54 integral with a hollow shaft 56 keyed to an inner gear shaft 33. Shafts 56 and 33 are supported by ball bearings 58 and 59, the former being supported directly by the fixed structure of the case, and bearing 59 being supported by the shaft of a differential gear spider 61. Shaft 33 provides one of the inputs through pinion 69 to a differential gear 32, and spider 61 is integral with a gear 62 which provides the output of the differential. The other input to differential 32 is through a gear 63 integral with the case of overrunning clutch 13 and rotating with gear 12. Gear 63 meshes with gear 64 fixed to the shaft of differential pinion 66, which is the other input to differential 32. Gear 64 is supported by ball bearings 67 on a non-rotating stub shaft 68 fixed to the case. One or more planet gears 71 meshing with the pinions 66 and 69 are supported on radial axes in the spider 61 by ball bearings 72. Spider 61 is rotatably supported on the shaft or gear 66 by a ball bearing 73, and by ball bearing 74 mounted in the case. The ratios between gears 51 and 54 and between gears 63 and 64 are equal so that the rotation of gear 64 bears the same ratio to the speed of the fastest engine as that of gear 54 bears to the speed of the particular engine driven by the particular shaft 11. Therefore, the rotation of spider 61 and gear 62 is proportional to the difference between the speed of the fastest engine and the individual engine. The three differentials 32 are evenly angularly distributed around the axis of the control. Each is coupled through a sprag-type overrunning clutch 34 to a bevel gear 36 supported on the shaft of spider 61 by ball bearings. Each of the bevel gears 36 meshes with the bevel gear 37 coaxial with gear 14. Gear 37 is fixed to a shaft 38 supported by bearings 81 and 82 in spiders 83 and 84 in the case 45. The gear 37 will therefore be driven by the fastest rotating of gears 36, which will be the gear driven by the slowest engine. Therefore, the rotation of gear 37 and shaft 38 is proportional to the difference between the fastest and slowest engines. The ratios of the gears are so chosen that shaft 38 rotates at half the relative speed of shaft 16. In other words, one rotation of shaft 38 represents a certain number of revolutions gained by the fastest shaft over the slowest. The same number of revolutions of shaft 16 represents twice this number of revolutions of the fastest shaft.

A flange 86 on the shaft 38 mounts the spider 87 of differential gear 40, previously referred to. One or more bevel planet gears 88 supported in the spider mesh with a bevel sun gear 89 threaded onto shaft 16. The other sun gear 91 of differential 40 is integral with a shaft 92, one end of which is supported in flange 86 by bearing 93, and the other end of which is supported by a bearing, not shown. Differential 40 is a subtracting differential, sun gear 89 being moved proportionally to the speed of the fastest engine and planet carrier 87 being moved proportionally to half the difference of the speeds of the fastest and slowest engines. Therefore, gear 91 and shaft 41 rotate at the same ratio to the speed of the slowest engine, whichever that may be. Gear 91 is coupled to shaft 89 by face splines 94 and the two are held engaged by a hollow tie bolt 96. Gear 14 and shaft 16 are supported for rotation in the case by ball bearings 97. The left end of shaft 41 and tie bolt 96, and the bearing therefor, may have any suitable structure. Suitable gearing (not illustrated) may couple shafts 16 and 41 to driven devices such as those illustrated in FIGURE 1.

Proceeding now to the arrangement for deriving the difference between the speed of each individual engine and the slowest engine, this involves the screw type differentials 42 at the right end of FIGURE 2, there being one such differential for each engine. A differential screw device such as 42 is a type of differential in which the output is represented by axial movement of one of two relatively rotating parts caused by screwing one onto or off the other as a result of differences between their rates of rotation. One input member of each differential 42 is a sleeve 101, non-reciprocably mounted in a bearing 102 in the case structure, which is integral with a bevel gear 103 meshing with a bevel gear 104 fixed to bevel gear 37, the rotations of which are proportional to the difference between the fastest and slowest engines. A nut 106 coupled by splines 105 so as to rotate with sleeve 101, but relatively movable axially, is internally threaded and is threaded onto the externally threaded end portion of a shaft 107. Shaft 107 is supported by nut 106 and by ball bearing 108 mounted in the case. Sleeve 107 is integral with a gear 109 meshing with gear 62, so that gear 109 and shaft 107 rotate proportionally to a particular engine. The overall gear ratio between the shafts 11 and shafts 101 and 107, respectively, are equal, so that if shaft 107 is driven by the slowest engine, it turns at the same speed as sleeve 106, and nut 106 will not move axially of its axis of rotation. If the shaft 107 is driven at a speed above the slowest, the nut 106 will move axially outwardly. This axial movement may be utilized by suitable mechanism to reduce the flow of fuel to the faster engines to bring them into synchronism. As illustrated in FIGURE 2, a rocker arm or lever 112 pivoted at 113 on the case engages the flange 114 of sleeve 106. The mechanism of the flow divider itself and the details of the connection to it form no part of this invention and are not material to an understanding of this invention. Therefore, these details will be omitted in the interest of conciseness.

The details of the mechanical connection from shaft 16 and shaft 41 to the fuel control and other accessory devices, shown schematically in FIGURE 1, are also immaterial to this invention.

The operation of my device should be clear from the foregoing, but may be reviewed briefly. Each engine drives a shaft 11 and, through its overrunning clutch 13, drives master gear 14 and shaft 16, which is driven by the engine which runs faster, or by any two or three engines if they are running at the maximum speed. It is possible for all engines to be running at the same speed because the accessory load tends to synchronize the engines. If the engines are out of synchronism, the relative rotation of the parts of any of the overrunning clutches 13 drives a spider 61 of the differential 32 of that engine at half the speed difference. The fastest moving spider 61 drives gear 37 and shaft 38 through its overrunning clutch 34.

This motion is subtracted in differential 40 from that of shaft 16 so that the output through shaft 41 is the difference between the slowest and fastest engines. Shaft 41 may be connected to the fuel control to operate an acceleration limiter, for example.

It is desirable to provide means to trim fuel flow to the engines to cause them to operate as nearly in balance as possible. This may be accomplished by diverting fuel away from the faster engines toward the slower ones, which may be done by any suitable flow divider or balancer 37. There is a screw type differential 42 for each engine, these being driven by the difference between the fastest engine and the particular engine, and by the difference between the fastest engine and the slowest engine. The output is the difference between these, or the difference between the particular engine and the slowest engine.

It will be seen that the system and structure illustrated and described are particularly adapted to provide a drive to the fuel control and to engine or aircraft accessories of a clustered or multiple engine installation, and to provide an output which may be utilized for operation of fuel controls or other apparatus effective to bring the engines to more nearly balanced output.

The detailed description of the preferred embodiment of the invention to explain the principles thereof is not to be considered as limiting or restricting the invention, as many modifications can be made by exercise of skill in the art without departing from the scope of the invention.

I claim:

1. In a plural engine power plant, in combination, a plurality of engines, a shaft driven by each engine, an overrunning clutch driven by each said shaft, a first shaft driven by the said overrunning clutches at a speed proportional to that of the fastest engine, a differential device for each engine having an input driven concurrently with the first shaft and an input driven by the respective engine, each differential device having an output proportional to the difference of speeds of the fastest engine and the respective engine, an overrunning clutch driven by each said differential device, a common output driven by the second-recited overrunning clutches at a speed proportional to the difference of speeds of the fastest and slowest engines, and a subtracting differential device having an input driven by the said common output and an input driven concurrently with the first shaft and having an output proportional to the speed of the slowest engine.

2. A combination as recited in claim 1 including also means for subtracting the speed of the slowest engine from the speed of at least one engine other than the fastest engine.

3. A combination as recited in claim 1 including means for subtracting the movement of a part driven concurrently with the slowest engine from that of a part driven concurrently with each other engine, and outputs driven by the last-mentioned means.

4. In a plural engine power plant, in combination, a plurality of engines, an accessory shaft driven by each engine, an overrunning clutch driven by each said shaft, a takeoff shaft driven by the said overrunning clutches at a speed proportional to that of the fastest engine, a differential gear for each engine having an input driven concurrently with the takeoff shaft and an input driven by the respective engine, each differential gear having an output proportional to the difference of speeds of the fastest engine and the respective engine, an overrunning clutch driven by each said differential gear, a common gear driven by the second-recited overrunning clutches at a speed proportional to the difference of speeds of the fastest and slowest engines, and a subtracting differential gear having an input driven by the common gear and an input driven concurrently with the takeoff shaft and having an output proportional to the speed of the slowest engine.

5. A combination as recited in claim 4, including also means for subtracting the speed of the slowest engine from the speed of at least one engine other than the fastest engine.

6. A combination as recited in claim 4, including means for subtracting the movement of a part driven concurrently with the slowest engine from that of a part driven concurrently with each other engine, and outputs driven by the last-mentioned means.

References Cited in the file of this patent

UNITED STATES PATENTS

| | | |
|---|---|---|
| 2,638,740 | Sammons | May 19, 1953 |
| 2,782,602 | Hamilton | Feb. 26, 1957 |